United States Patent Office 3,257,407
Patented June 21, 1966

3,257,407
PERFLUOROALKYL SUBSTITUTED
AMMONIUM SALTS
Neal O. Brace, Chicago, Ill., assignor to E. I. du Pont de Nemours and Company, Wilmington, Del., a corporation of Delaware
No Drawing. Filed Sept. 27, 1963, Ser. No. 313,143
8 Claims. (Cl. 260—290)

This application is a continuation-in-part of my copending application Serial No. 101,290, filed April 6, 1961, now abandoned.

This invention is directed to compositions having the structure $[C_nF_{2n+1}(CH_2)_mNR_3]^+X^-$ wherein $n$ is from 3 to 20, $m$ is from 3 to 30, the various R groups being hydrogen or alkyl and X is anion of a salt-forming acid.

Organic ammonium salts are well known as surface active agents and fluorine substituted amines and ammonium salts are noted for their particular properties. Three particular types of perfluoroalkyl substituted ammonium salts are well known. U.S. Patent 2,727,923 discloses $[C_nF_{2n+1}CH_2NR_1R_2R_3]^+X^-$, prepared by reduction of the amide $C_nF_{2n+1}CONR^1R^2$ to $C_nF_{2n+1}CH_2NR^1R^2$ followed by reaction with $R^3X$ to form the final product. U.S. Patent 2,764,202 discloses $$[C_nF_{2n+1}CONH(CH_2)_nNR_3]^+X^-$$

prepared by reacting $C_nF_{2n+1}COCl$ with $NH_2(CH_2)_nNR_2$ to give $C_nF_{2n+1}CONH(CH_2)_nNR_2$ followed by reaction with RX to give the final product. U.S. Patent 2,759,019 discloses $[C_nF_{2n+1}SO_2NH(CH_2)_nNR_3]^+X^-$, prepared by reacting $C_nF_{2n+1}SO_2Cl$ with $NH_2(CH_2)_nNR_2$ followed by reaction with RX. These three types of ammonium salts all require preparation of the acids $C_nF_{2n}+_1CO_2H$, $$C_nF_{2n+1}SO_2H$$

or acid chlorides thereof. Of the three types, only the first, i.e. $[C_nF_{2n+1}CH_2NR_3]^+X^-$, contains no functional groups other than the ammonium salt group; the other two contain amide or sulfonamide groups which are cleaved under conditions of high acidity or high basicity.

The perfluoroalkyl iodides $C_nF_{2n+1}I$ have recently become readily available from relatively cheap starting materials. It has been found recently also that the perfluoroalkyl iodides are readily added to a variety of olefinic compounds. The addition compounds are readily converted to compounds of structure $C_nF_{2n+1}(CH_2)_mX$ where X may be hydrogen or a functional group of some sort such as

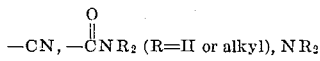

halogen such as Cl, Br and I.

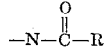

or $CO_2R$—OH, etc.

It is, therefore, an object of the present invention to provide novel ammonium salts having the structure:

$$[C_nF_{2n+1}(CH_2)_mNR_3]^+X^-$$

It is another object of this invention to provide means for preparing ammonium salts of the structure $$[C_nF_{2n+1}(CH_2)_mNR_3]^+X^-$$

from $C_nF_{2n+1}I$.

These and other objects will become apparent in the following description and claims.

More specifically, the present invention is directed to a composition comprising

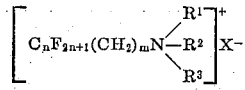

wherein $n$ is from 3 to about 20, $m$ is from 3 to about 30 and wherein

represents a radical derived from ammonia, and cyclic amines including those wherein $R^1$, $R^2$ and $R^3$ represent collectively the residue of the pyridine and substituted pyridine ring systems, X is the anion of a salt-forming acid.

A preferred embodiment of the present invention is directed to a composition comprising

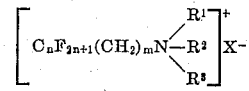

wherein $n$ is from 3 to about 20, $m$ is from 3 to about 30 and wherein

represents a radical derived from ammonia; pyridine; quinoline; picoline; and primary phenyl amine; and X is the anion of a salt-forming acid.

A more preferred embodiment of the present invention is directed to a composition comprising

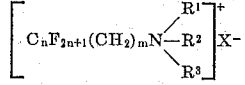

wherein $n$ is from 3 to about 20, $m$ is from 3 to about 30 and wherein

represents a radical derived from ammonia and pyridine, and X is the anion of a salt-forming acid.

The compositions of the present invention are all prepared directly from $C_nF_{2n+1}I$ by one of several courses. Where $m$ is an even number, i.e. 4, 6, 8, 10, etc., these herein described novel compounds are most readily prepared by reacting the products $C_nF_{2n+1}(CH_2)_mI$ with the amine

to give

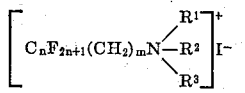

($m=4, 6, 8, 10$ etc.). The intermediates $$C_nF_{2n+1}(CH_2)_mI$$

are prepared by reacting $C_nF_{2n+1}I$ with ethylene in the presence of a free radical generating initiator such as heat, α,α-azo-bisisobutyronitrile, ditertbutyl peroxide, α,α-azo-bisbutyromidine dihydrochloride, benzoyl peroxide, lauryl peroxide and the like. This reaction gives a series of compounds containing an even number of methylene groups. A few representative examples follow.

| Compound | B.P., °C./mm. Hg | M.P., °C. | $n_D^{25}$ |
|---|---|---|---|
| $C_3F_7(CH_2CH_2)_2I$ | 108–109/80 | | 1.3983 |
| $C_3F_7(CH_2CH_2)_3I$ | 82–83/4.5 | | 1.4206 |
| $C_3F_7(CH_2CH_2)_4I$ | 138/20 | | 1.4150 |
| $C_3F_7(CH_2CH_2)_5I$ | 147/10 | | 1.4241 |
| $C_7F_{15}(CH_2CH_2)_2I$ | 108–109/8.5 | 38–45 | |
| $C_7F_{15}(CH_2CH_2)_3I$ | 133–136/9 | 36–39.5 | |
| $C_7F_{15}(CH_2CH_2)_4I$ | 108/0.6 | | |
| $C_7F_{15}(CH_2CH_2)_5I$ | 119/0.6 | | |

Although the compounds $C_nF_{2n+1}CH_2CH_2I$ are obtained from the reaction of $C_nF_{2n+1}I$ with ethylene, these compounds cannot be used to prepare the products of the present invention since they react with the basic amines to form olefins, i.e.

$$C_nF_{2n+1}CH_2CH_2I + R_3N \rightarrow C_nF_{2n+1}CH=CH_2 + R_3N \cdot HI$$

The iodides $C_nF_{2n+1}I$ are available from a variety of sources. The preferred source, because of its versatility, is the reaction of $CF_3I$ or $C_2F_5I$, which themselves are readily available, with perfluorinated olefins such as tetrafluoroethylene or hexafluoropropylene under the influence of light or heat (see Haszeldine, J. Chem. Soc., 1949, 2856, 1953, 376; and Hauptschein et al., J.A.C.S., 79, 2549 (1957)). The preferred series of starting materials are $CF_3(CF_2)_nI$. Those containing an odd number of carbons, i.e. $C_3F_7I$, $C_5F_{11}I$, $C_7F_{15}I$, $C_9F_{19}I$, $C_{11}F_{23}I$, $C_{13}F_{27}I$, etc., are prepared by reacting $CF_3I$ with $CF_2=CF_2$. Those containing an even number of carbons, i.e. $C_4F_9I$, $C_6F_{13}I$, $C_8F_{17}I$, $C_{10}F_{21}I$, $C_{12}F_{25}I$, $C_{14}F_{29}I$, etc., are prepared by reacting $C_2F_5I$ with $CF_2=CF_2$. Of course, higher members can be prepared from lower members if available by the same reaction, e.g.

$$C_3F_7I + C_2F_4 \rightarrow C_5F_{11}I$$

$C_7F_{15}I$, $C_9F_{19}I$, etc. and $C_4F_9I + C_2F_4 \rightarrow C_6F_{13}I$, $C_8F_{17}I$, $C_{10}F_{21}I$, etc.

Other intermediates derivable from $C_nF_{2n+1}I$ are obtained from a variety of starting materials. The following equations represent a few other known methods for preparing the compositions of the present invention:

I.
$$C_nF_{2n+1}I + CH_2=CH(CH_2)_mCN \xrightarrow[\text{catalyst}]{\text{radical}} C_nF_{2n+1}CH_2CHI(CH_2)_mCN$$
(m=0)

$$C_nF_{2n+1}CH_2CHI(CH_2)_mCN + H_2 \xrightarrow{\text{catalyst}} C_nF_{2n+1}(CH_2)_{m+3}NH_2$$

$$C_nF_{2n+1}(CH_2)_{m+3}NH_2 + 3RX \xrightarrow{\text{base}} [C_nF_{2n+1}(CH_2)_{m+3}NR_3]^+X^-$$
(X=halogen, aryl $SO_2$, etc.)

II.
$$C_nF_{2n+1}I + CH_2=CH(CH_2)_mCO_2H \xrightarrow[\text{catalyst}]{\text{radical}} C_nF_{2n+1}CH_2CHI(CH_2)_mCO_2H$$

$$C_nF_{2n+1}CH_2CHI(CH_2)_mCO_2H + LiAlH_4 \longrightarrow C_nF_{2n+1}(CH_2)_{m+2}CH_2OH$$

$$C_nF_{2n+1}(CH_2)_{m+2}CH_2OH + ASO_2Cl \xrightarrow{\text{base}} C_nF_{2n+1}(CH_2)_{m+2}CH_2O_3SA$$

$$C_nF_{2n+1}(CH_2)_{m+2}CH_2O_3SA + R_3N \longrightarrow [C_nF_{2n+1}(CH_2)_{m+1}NR_3]^+ASO_3^-$$
(A=aryl or alkyl group)

IIa.
$$C_nF_{2n+1}I + CH_2=CH(CH_2)_mCH_2OH \xrightarrow[\text{catalyst}]{\text{radical}} C_nF_{2n+1}CH_2CHI(CH_2)_mCH_2OH$$

$$C_nF_{2n+1}CH_2CHI(CH_2)_mCH_2OH + H_2 \xrightarrow{\text{catalyst}} C_nF_{2n+1}(CH_2)_{m+2}CH_2OH$$

IIb.
$$C_nF_{2n+1}(CH_2)_{m+2}CH_2OH + HBr \longrightarrow C_nF_{2n+1}(CH_2)_{m+2}CH_2Br$$

$$C_nF_{2n+1}(CH_2)_{m+2}CH_2Br + R_3N \longrightarrow [C_nF_{2n+1}(CH_2)_{m+3}NR_3]^+Br^-$$

III.
$$C_nF_{2n+1}(CH_2)_mI + KCN \longrightarrow C_nF_{2n+1}(CH_2)_mCN + KI$$

$$C_nF_{2n+1}(CH_2)_mCN + H_2 \xrightarrow{\text{catalyst}} C_nF_{2n+1}(CH_2)_mCH_2NH_2$$

IV.
$$C_nF_{2n+1}I + CH_2=CH(CH_2)_mCONR_2 \xrightarrow[\text{catalyst}]{\text{radical}} C_nF_{2n+1}CH_2CHI(CH_2)_mCONR_2$$

$$C_nF_{2n+1}CH_2CHI(CH_2)_mCONR_2 + LiAlH_4 \longrightarrow C_nF_{2n+1}(CH_2)_{m+2}CH_2NR_2$$

$$C_nF_{2n+1}(CH_2)_{m+2}CH_2NR_2 + RX \longrightarrow [C_nF_{2n+1}(CH_2)_{m+2}CH_2NR_3]^+X^-$$
$\begin{bmatrix} R=H \\ X=\text{halide, sulfato, sulfonato, phosphato, etc.} \end{bmatrix}$ The compositions of the present invention have the structure $$\left[ C_nF_{2n+1}(CH_2)_mN\begin{matrix} R^1 \\ -R^2 \\ R^3 \end{matrix} \right]^+ X^-$$

wherein $n$ has a value of from 3 to about 20 and $m$ of from 3 to about 30. These compositions are useful as surface active agents in aqueous and nonaqueous solvent systems so long as $n$ is 3 or greater. If $n$ is less than 3, they cease to be useful surface active agents, particularly in nonaqueous solvents. As surface active agents, these compositions have a variety of uses such as decreasing the surface tension of aqueous solutions to remarkably low values, and for decreasing the surface tensions of many organic solvents, excepting highly fluorinated solvents. They also find use in other applications such as leveling agents in wax formulations and the like, for forming stable water in hydrocarbon emulsions, for adsorption on glass surfaces to give hydrophobic surfaces and, when dissolved in water, to form highly successful fire extinguishing agents for hydrocarbon type fires. In certain cases these compositions are also adsorbed on textile fabrics to form useful oil and water repellent coatings.

As noted heretofore, the lower limit of $n$ of 3 is based on utility. Compositions wherein $n$ is one or two can be prepared by the general methods outlined above but lack the desired utility. The upper value of $n$ is based on availability, starting materials $C_nF_{2n+1}I$ are not readily available for values of $n$ greater than 20. It will be seen in the general synthetic methods outlined herein that compositions wherein $m$ is less than three are not readily obtainable from the starting iodides $C_nF_{2n+1}I$. The upper limit of $m$ is again based on availability of starting materials.

The compositions $$\left[ C_nF_{2n+1}(CH_2)_mN\begin{matrix} R^1 \\ -R^2 \\ R^3 \end{matrix} \right]^+ X^-$$

are ammonium salts. The substituents $R^1$, $R^2$ and $R^3$ may be hydrogen. $R^1$ may be an aromatic group such as phenyl but, due to the methods of synthesis, $R^2$ and/or $R^3$ may not be an aromatic group along with $R^1$. It is generally preferable that either $R^2$ or $R^3$ or both be hydrogen when $R^1$ is an aromatic group although it is not necessary that this be so. $R^1$, $R^2$ and $R^3$ may also, collectively, represent a radical derived from a pyridine or substituted pyridine ring system. Representative examples of the group

include: —NH$_3$,

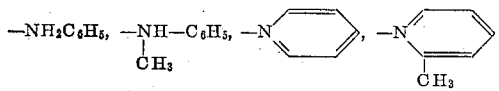

and

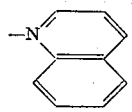

The anion X⁻ is, in general, the anion of a salt-forming acid. From the methods of synthesis outlined heretofore, X⁻ can be a halide ion, e.g., chloride, bromide or iodide, a sulfate anion HSO$_4$⁻ or SO$_4$=, a phosphate anion, an arylsulfonate anion, an alkylsulfonate anion and the like. If, for some particular application, the anion derived from the synthesis is undesirable, it can be exchanged for another anion by well known means, including anions of organic acids such as acetate anion. Of course, in the synthetic method listed as IV above, RX can be any acid capable of forming an ammonium salt. Other methods such as distillaton of a volatile acid from solution or precipitation of a particular anion with a specific metal, e.g., removal of chloride by silver, sulfate by barium, leaving another anion in its place can also be used.

The following representative examples illustrate the present invention.

*Example I*

The compound C$_3$F$_7$(CH$_2$)$_4$I was heated with agitation at about 75° C. under nitrogen. Pyridine was added slowly over a period of about six hours until a 100% excess over a molar equivalent amount had been added.

The reaction mixture was then cooled and the product taken up in anhydrous ether under nitrogen. The white product was collected by filtration. After recrystallization from hot ethyl acetate, a 100% yield of

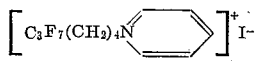

was obtained, melting point 79.0 to 80.7° C.

*Analysis.*—Calcd. for C$_{12}$H$_{13}$F$_7$NI: C, 33.4; H, 3.0; N, 3.2; I, 30.9; F, 30.9. Found: C, 33.4; H, 3.1; N, 3.0; I, 30.0; F, 30.8.

Using essentially the same procedure, the following products are obtained:

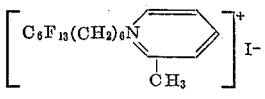

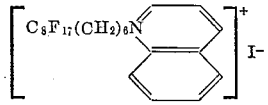

*Example II*

Example I was repeated by treating C$_7$F$_{15}$(CH$_2$)$_4$I with a 100% molar excess of pyridine over a period of six hours. The white product was taken up in anhydrous ether, collected and recrystallized from hot ethyl acetate, giving a 100% yield of

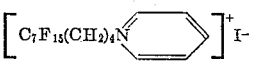

melting point 95° C.

*Analysis.*—Calcd. for C$_{16}$H$_{13}$F$_{15}$NI: C, 30.4; H, 2.1; N, 2.2; I, 20.2; F, 45.2. Found: C, 30.7; H, 2.4; N, 1.6; I, 20.6; F, 45.0.

*Example III*

A solution of 14.4 parts of potassium cyanide and 70.4 parts of C$_3$F$_7$(CH$_2$)$_4$I in 200 parts of 95% aq. alcohol is refluxed at 80° C. for 29 hours. The alcohol is then removed at 300 mm. pressure. The resulting slurry is filtered and the oil which separates when 100 parts of water is added to the filtrate is extracted into methylene chloride which is also used to wash the salt cake. The organic solution is washed with water, 10% aq. hydrochloric acid and dried over magnesium sulfate. The product C$_3$F$_7$(CH$_2$)$_4$CN distills at 104.5° C. at 20 mm., $n_D^{25}$ 1.3458 (80% yield). The infrared spectrum shows the —C≡N group at 4.42μ.

*Analysis.*—Calcd. for C$_8$F$_7$H$_8$N: F, 52.96; C, 38.3; H, 3.2. Found: F, 52.7; C, 38.5; H, 3.2.

The nitrile C$_3$F$_7$(CH$_2$)$_4$CN (39.8 parts) is dissolved in acetic anhydride containing sodium acetate. Raney nickel catalyst is added and the nitrile is hydrogenated at 50° C. and 50 p.s.i.g. hydrogen pressure for four hours. The solid catalyst is then removed by filtration of the warm solution and the filtrate is combined with 40 parts of water then 1–2 parts of concentrated hydrochloric acid is added cautiously while the temperature rises to 35° C.; another 2–3 parts of acid are then added and a rapid evolution of heat results. When the mixture is acidic, due to further addition of acid, it is heated for 5 hours at reflux. Sodium hydroxide solution (5 N) is then added until the mixture is strongly alkaline, giving a precipitate. The alkaline mixture is extracted with ether and the ether solution dried over magnesium sulfate. Dry hydrogen chloride gas is then added to the ether solution giving [C$_3$F$_7$(CH$_2$)$_5$NH$_3$]⁺Cl⁻ which precipitates, M.P. 121–123° C.

*Analysis.*—Calcd. for C$_8$F$_7$H$_{13}$NCl: C, 32.9; H, 4.5; N, 4.8; Cl, 12.2. Found: C, 33.5; H, 4.5; N, 4.4; Cl, 12.3.

Other compounds which may be prepared by this method include:

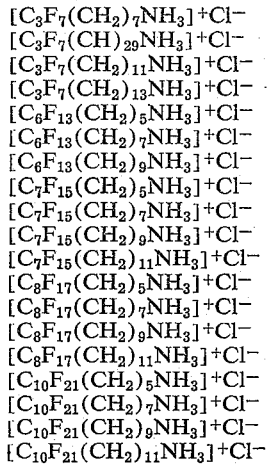

By adding dry hydrogen bromide, the corresponding hydrobromides are obtained, e.g.

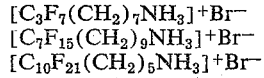

*Example IV*

A mixture of 50 parts of perfluoroheptyl iodide, 15 parts of 10-undecenamide and 0.3 part of α,α'-azobisisobutyronitrile is heated under nitrogen for 7 hours at 82–85° C. The resulting orange product has a melting range of 81–85° C. Excess perfluoroheptyl iodide (16.1 parts) is removed by distillation under vacuum giving 49.2 parts (90% yield) of $C_7F_{15}CH_2CHI(CH_2)_8CONH_2$, M.P. 80–91° C. A sample recrystallized from chloroform has a melting point of 99.5–101° C.

*Analysis.*—Calcd. for $C_{18}H_{21}F_{15}ION$: C, 31.8, H, 3.1; I, 18.7; N, 2.06. Found: C, 32.1; H, 3.3; I, 18.2; N, 1.4.

A slurry of 5.5 parts of lithium aluminum hydride in 142 parts of pure, dry ether is placed in a vessel fitted with an addition funnel, a nitrogen inlet tube and a Soxhlet extractor mounted under an efficient condenser. The above prepared amide (43 parts) is placed in rather large pieces in the extractor cup and covered with 71 parts of ether. The ether in the reaction vessel is then heated at reflux. When the cup of the extractor overflows and the dilute solution of the amide returns to the reaction vessel, a vigorous foaming occurs for the first two or three times, but the succeeding times are uneventful. Refluxing and stirring of the reaction mixture is continued until all of the solid in the extractor cup is dissolved (about 20 hours). The reaction mixture is then heated a further 24 hours to ensure completion of the reaction.

Ethyl acetate (14 parts) is added to the resulting slurry slowly at 26° C. to destroy the excess lithium aluminum hydride. A cooling bath is provided. Then six parts of water are added dropwise with vigorous gas evolution, heat evolution and thickening of the reaction mixture. It is then necessary to add a further 70 parts of ether to make stirring possible. Then 5.0 parts of 20% aq. sodium hydroxide are added followed by 20 parts of water. The ether layer is decanted from the resulting white slurry and the slurry is washed with ether. The combined ether solutions are evaporated giving 32.2 parts of a yellow solid. Distillation gives 24.2 parts of $C_7F_{15}(CH_2)_{11}NH_2$, B.P. 122° C./1.0 mm., M.P. 80–86° C. The yield is 80%.

*Analysis.*—Calcd. for $C_{18}F_{15}H_{24}N$: C, 40.1; F, 52.9; H, 4.4; N, 2.6. Found: C, 40.4; F, 52.6; H, 4.6; N, 2.5.

When the above amine is applied to a polished stainless steel plate by evaporation of a dilute acetone solution, and the resulting surface is heated, a drop of cetane exhibits a contact angle of 81°±1° and a drop of water a contact angle of 122°±1°. For comparison, under the same conditions, a $CF_3(CH_2)_{17}NH_2$ coated surface exhibits a cetane contact angle of 50–57° and a water contact angle of 93°; $CH_3(CH_2)_{17}NH_2$ exhibits a cetane contact angle of 40–43° and a water contact angle of 97–101°.

The above prepared amine $C_7F_{15}(CH_2)_{11}NH_2$ (17 parts) is dissolved in 70 parts of ether and 80 parts of absolute ethanol. Addition of anhydrous hydrogen chloride precipitates the hydrochloride $$[C_7F_{15}(CH_2)_{11}NH_3]^+Cl^-$$

which, though pure, exhibits the unusual melting point behavior of having a melting point which varies widely depending on rate of heating, etc. A similar phenomenon is known for $CH_3(CH_2)_{17}NH_2 \cdot HCl$.

*Analysis.*—Calcd. for $C_{18}F_{15}H_{25}NCl$: C, 37.6; H, 4.4; N, 2.4. Found: C, 37.9; H, 4.6; N, 2.3.

Surface tensions of 0.4% and 0.2% by weight of $[C_7F_{15}(CH_2)_{11}NH_3]^+Cl^-$ in water are 18.4 and 20.3 dynes/cm. respectively. These values are well below those obtainable with $C_{18}H_{37}NH_2 \cdot HCl$ and $$CF_3(CH_2)_{17}NH \cdot HCl$$

at the same concentrations.

$[C_7F_{15}(CH_2)_{11}NH_3]^+Cl^-$ aq. solutions cause glass to become hydrophobic by merely dipping the glass object into the solution. Such treated glass also repels decane, benzene, and chloroform. Acetone runs off without wetting the surface. $CF_3(CH_2)_{17}NH_2HCl$ does not produce this effect.

When samples of cotton, nylon and polyethylene terephthalate fabrics are dipped in 0.2% solutions of $[C_7F_{15}(CH_2)_{11}NH_3]^+Cl^-$ and dried in air, the resulting treated fabrics resist penetration by water and gasoline type hydrocarbons and are thus oil and water repellent. $CF_3(CH_2)_{17}NH_2 \cdot HCl$ does not produce this effect.

The above described procedure started with $$CH_2=CH(CH_2)_8CONH_2$$

Any other available amide $CH_2=CH(CH_2)_mCONH_2$ could be used as well. Alternately, $C_nF_{2n+1}I$ can be added to the acids $CH_2=CH(CH_2)_mCO_2H$, giving, after reductive removal of the iodine, $$C_nF_{2n+1}(CH_2)_{m+2}CO_2H$$

These acids are then readily converted to amides of the types $-CONH_2$, $-CONHR$ and $-CONR_2$, reduced with lithium aluminum hydride to the amines of types $-CH_2NH_2$, $-CH_2-NHR$ and $-CH_2NR_2$ and finally converted to the compositions of this invention by reaction with RX (e.g. HCl, HBr, HI, $CH_3Cl$, EtCl, cyclohexylbromide or chloride, methyl sulfate, methyl benzene sulfonate and the like). A large number of acids of structure $CH_2=CH(CH_2)_mCO_2H$, e.g. from $m=0$ to $m=15$, are well known to the art, thus leading to a large number of compositions $$[C_nF_{2n+1}(CH_2)_mNR_3]^+X^-$$

by the above described procedure.

*Example V*

N-allylacetamide (9.9 parts), 0.4 part of $\alpha,\alpha'$-azobisisobutyronitrile and 346 parts of n-perfluorobutyl iodide were heated together for seven hours at 80° C. A 65% conversion to two products was obtained. The first product was $C_4F_9CH_2CHICH_2NHCOCH_3$, B.P. 140–160° C./0.4 mm. (32% conversion, 14.2 parts).

*Analysis.*—Calcd. for $C_9F_9H_9INO$: C, 24.3; F, 38.4; H, 2.04; I, 28.5; N, 3.1. Found: C, 25.6; F, 36.0; H, 2.3; I, 28.2; N, 3.0.

The second product (33% conversion) was $$C_4F_9\left[\begin{array}{c} CH_2CH-\\ |\\ CH_2NHCOCH_3 \end{array}\right]_2 I$$

*Analysis.*—Calcd. for $C_{14}F_9H_{18}IN_2O_2$: C, 30.9; F, 31.4; H, 3.3; I, 23.3; N, 5.2. Found: C, 29.3; F, 30.8; H, 3.3; I, 25.9; N, 3.2.

29.3 parts of $C_4F_9CH_2CHICH_2NHCOCH_3$, 35 parts of glacial acetic acid and 33 parts of 55% aqueous hydrogen iodide were heated together at 120° C. for 3 hours. The red solution was cooled and 10% aqueous sodium sulfite was added until the solution was light yellow. Then potassium hydroxide was added until the pH was 9.0. Extraction of the basic solution with ether, drying the ether solution with magnesium sulfate and distillation gave a 36% yield of $C_4F_9(CH_2)_3NH_2$. B.P. 88° C./19 mm.

*Analysis.*—Calcd. for $C_7F_9H_8N$: C, 30.3; H, 2.9; F, 61.7; N, 5.0. Found: C, 29.2; H, 3.1; F, 55.5; N, 4.5.

The amine $C_4F_9(CH_2)_3NH_2$ was treated in ether solution with HCl giving $C_4F_9(CH_2)_3NH_2 \cdot HCl$. Water solutions of the salt are strongly surface active and strongly adsorbed on the surface of glass, making it hydrophobic.

Calcd.: C, 26.8; H, 2.9; Cl, 10.96. Found: C, 26.4; H, 2.9; Cl, 10.5.

It is understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

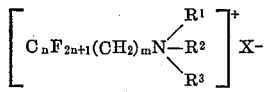

wherein $n$ is from 3 to about 20, $m$ is from 3 to about 30 and wherein

represents a radical derived from a member selected from the group consisting of ammonia; pyridine; quinoline; picoline; and primary phenyl amine; and X is selected from the group consisting of a halide ion, a sulfate anion, a phosphate anion, an arylsulfonate anion and an alkylsulfonate anion.

2. A compound of the formula

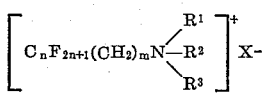

wherein $n$ is from 3 to about 20, $m$ is from 3 to about 30 and wherein

represents the radical derived from ammonia, and X is selected from the group consisting of a halide ion, a sulfate anion, a phosphate anion, an aryl sulfonate anion and an alkylsulfonate anion.

3. A compound of the formula

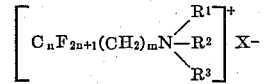

wherein $n$ is from 3 to about 20, $m$ is from 3 to about 30 and wherein

represents a radical derived from pyridine, and X is selected from the group consisting of a halide ion, a sulfate anion, a phosphate anion, an arylsulfonate anion and an alkylsulfonate anion.

4. The compound having the formula $[C_7F_{15}(CH_2)_{11}NH_3]^+Cl^-$

5. The compound having the formula

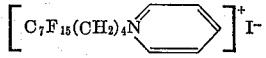

6. The compound having the formula

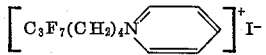

7. A compound of the formula

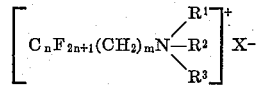

wherein $n$ is from 3 to about 20, $m$ is from 3 to about 30 and wherein

represents a radical derived from picoline, and X is selected from the group consisting of a halide ion, a sulfate anion, a phosphate anion, an arylsulfonate anion and an alkylsulfonate anion.

8. A compound of the formula

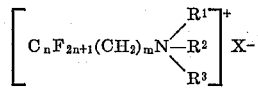

wherein $n$ is from 3 to about 20, $m$ is from 3 to about 30 and wherein

represents a radical derived from quinoline, and X is selected from the group consisting of a halide ion, a sulfate anion, a phosphate anion, an arylsulfonate anion and an alkylsulfonate anion.

References Cited by the Examiner

UNITED STATES PATENTS 2,727,923  12/1955  Husted _____ 260—567.6

WALTER A. MODANCE, *Primary Examiner.*

J. M. FORD, *Assistant Examiner.*